UNITED STATES PATENT OFFICE 2,686,604

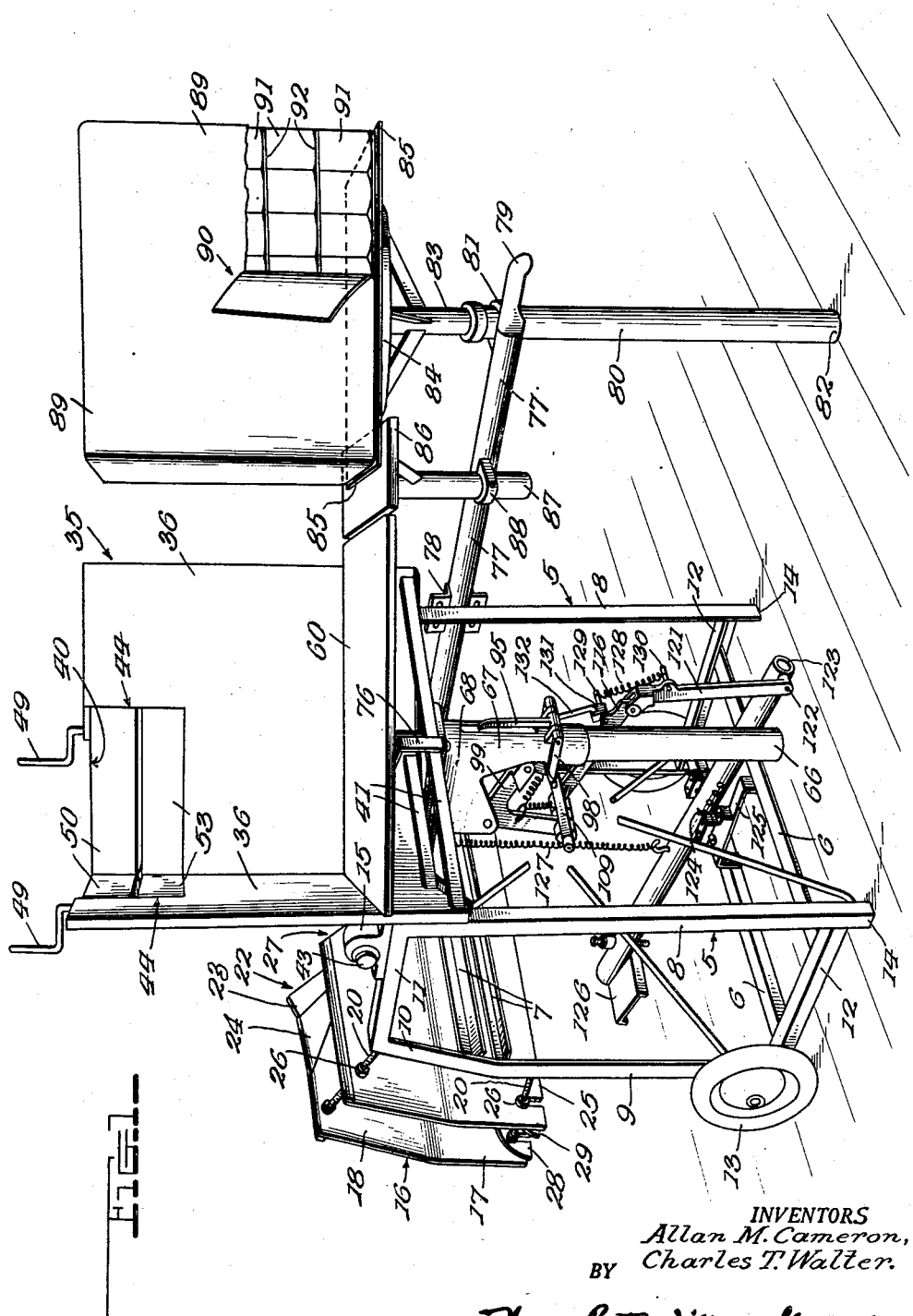

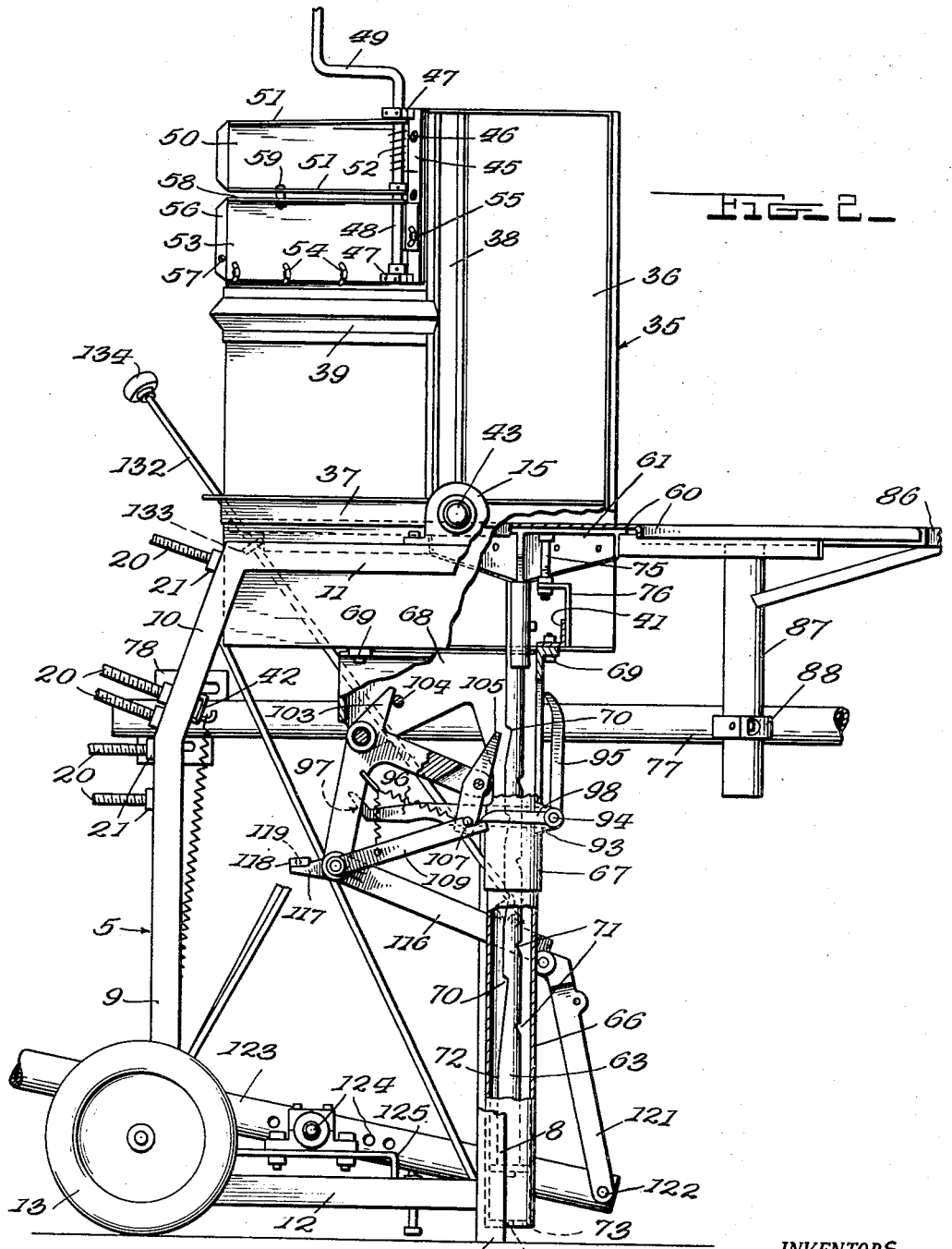

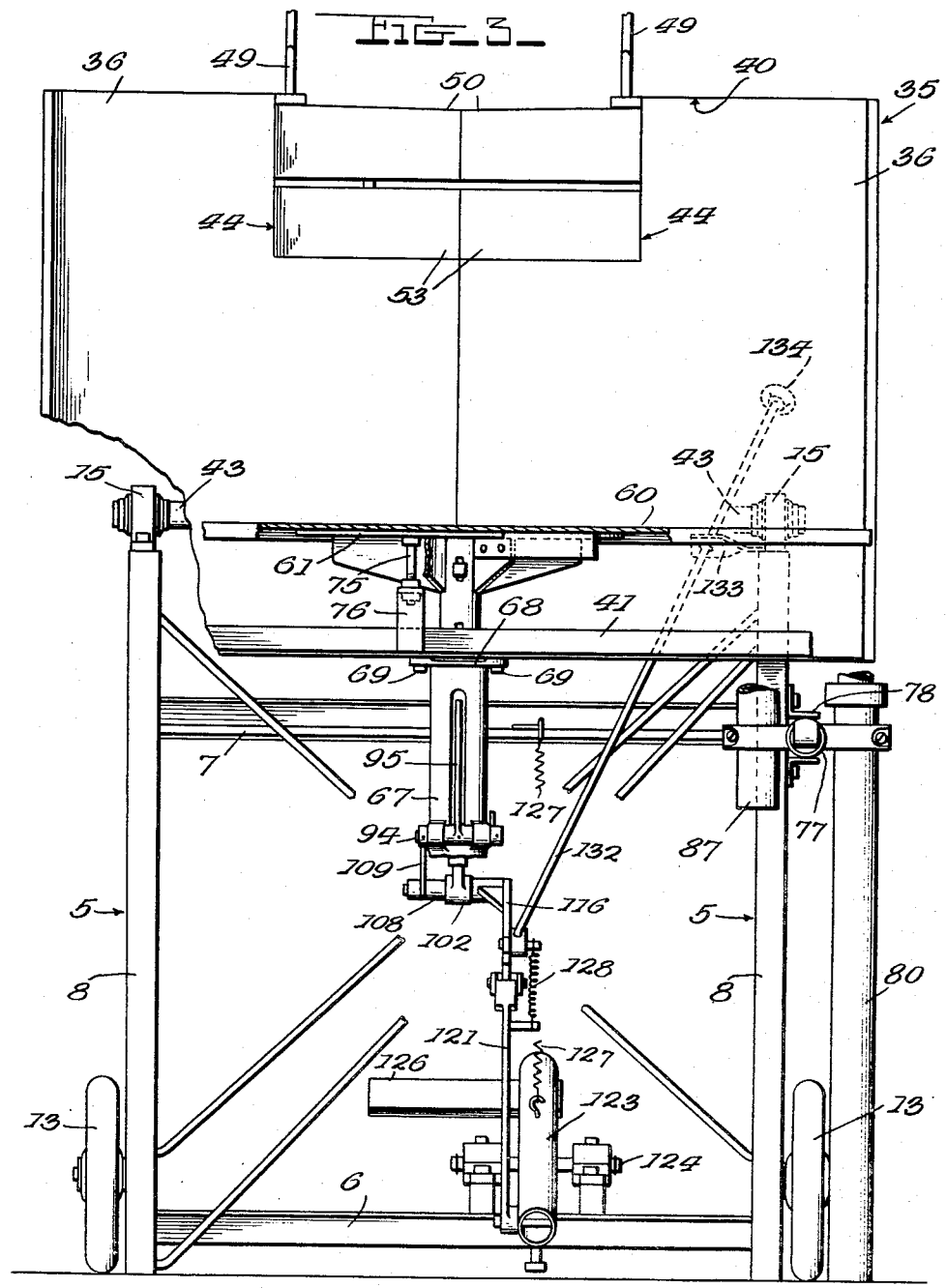

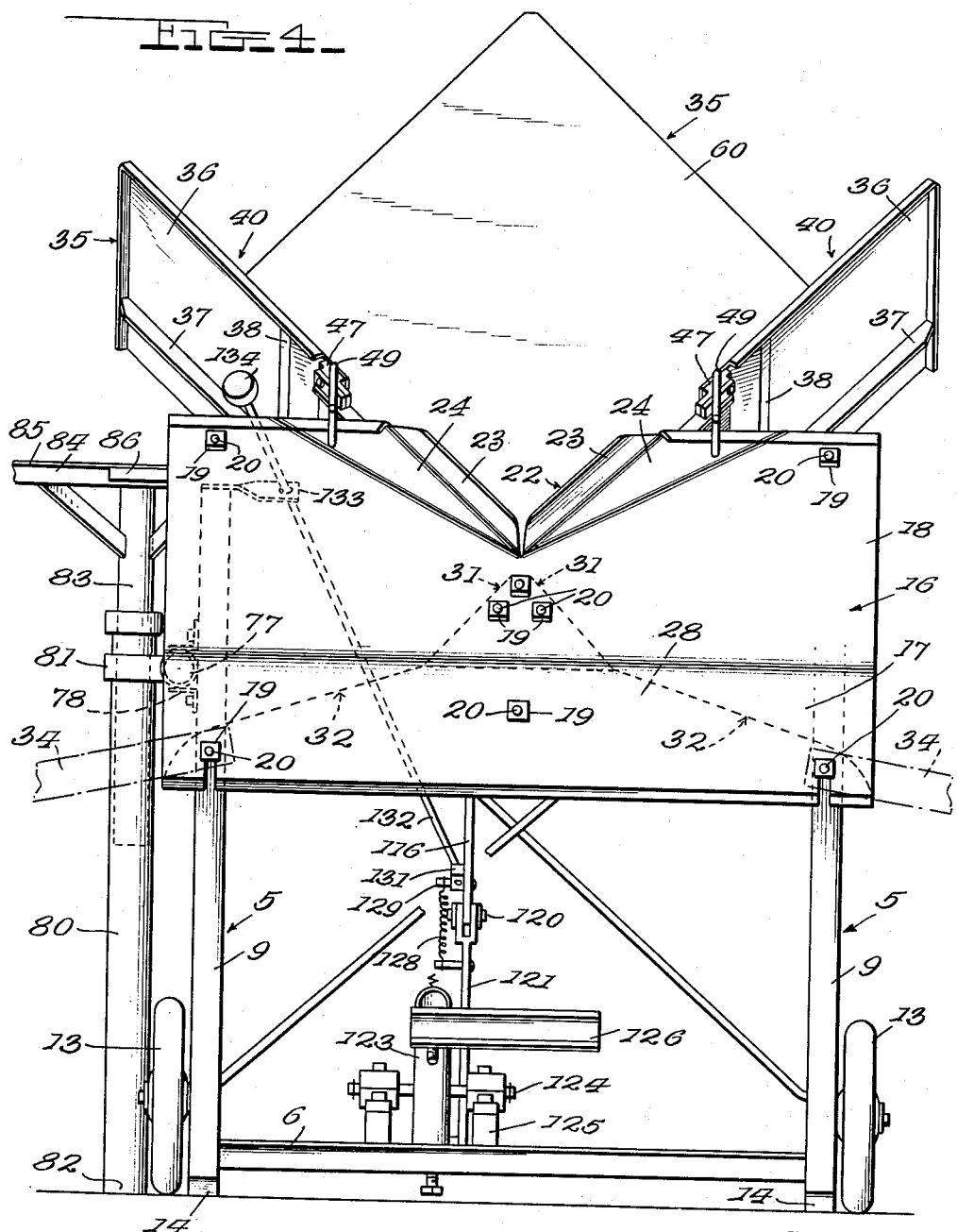

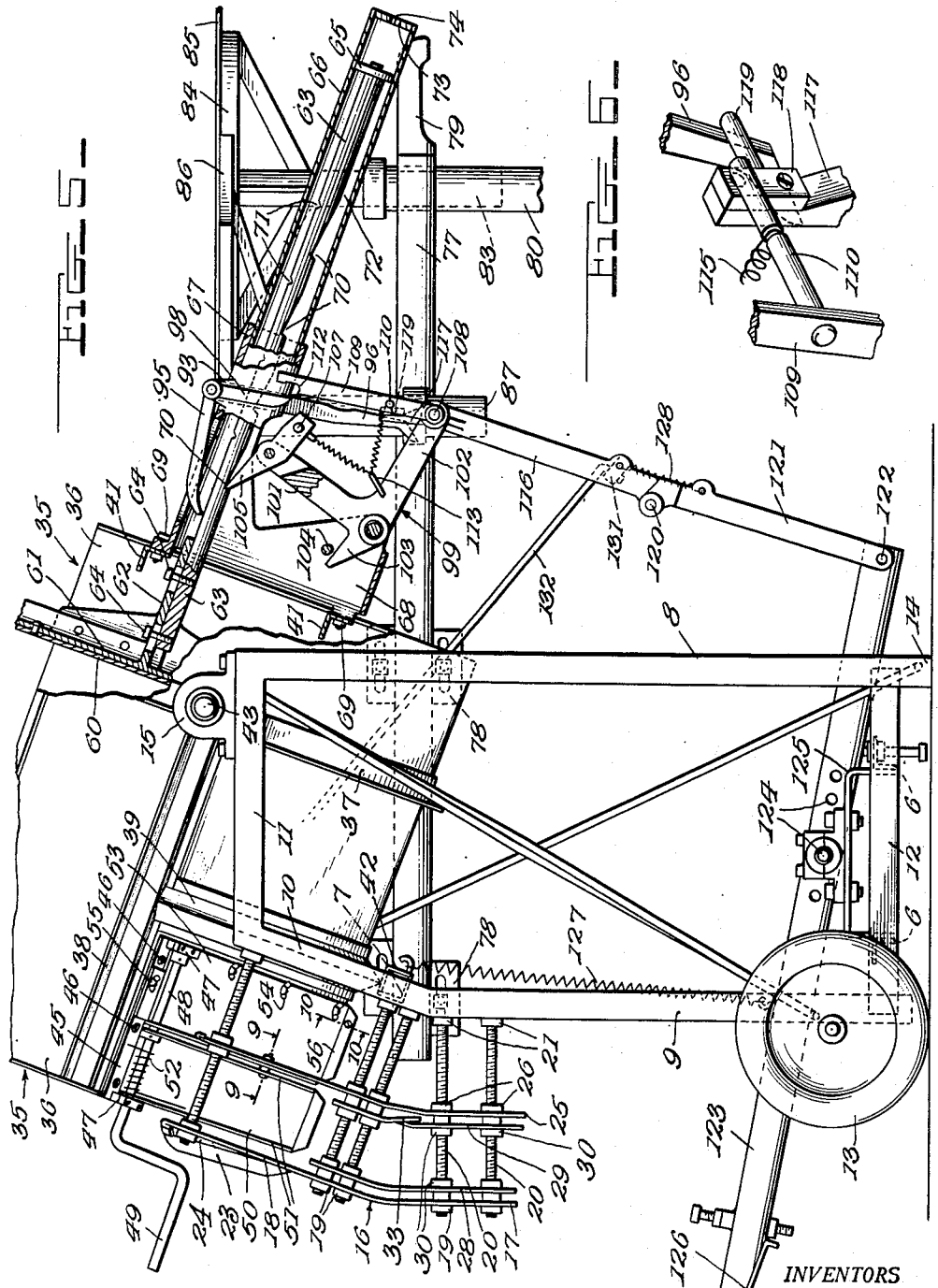

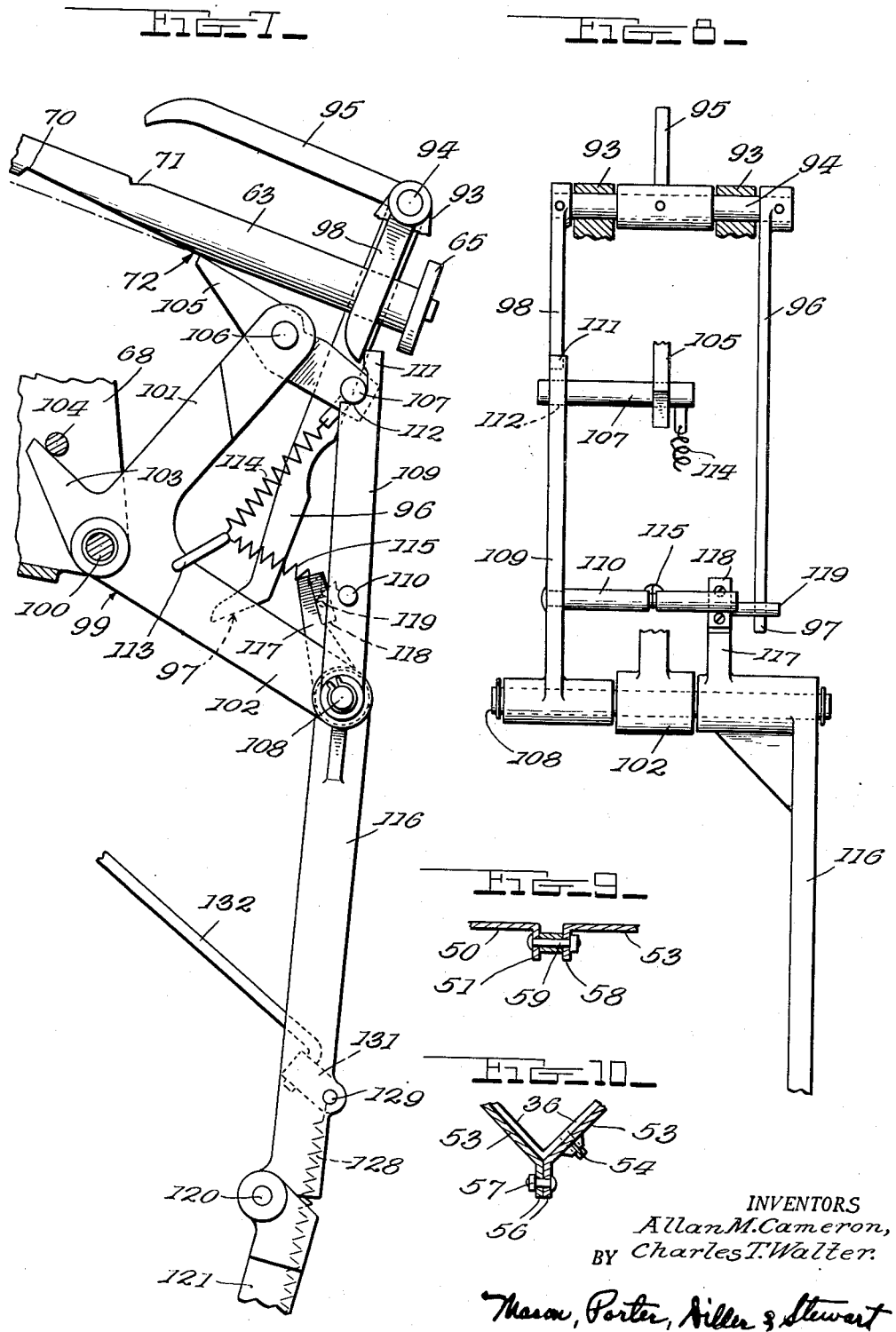

CAN BAG UNLOADING APPARATUS

Allan M. Cameron, River Forest, and Charles T. Walter, Markham, Ill., assignors to Continental Can Company, Inc., New York, N. Y., a corporation of New York Application November 14, 1949, Serial No. 126,968

27 Claims. (Cl. 214—8.5)

The invention relates generally to the art of handling unfilled open cans and primarily seeks to provide a novel apparatus for unloading the cans from bags in which they are packaged for storage and distribution to canners.

In the can manufacturing art great progress has been made in the production of efficiently operating body making and bottoming machinery, and cans are manufactured with great rapidity. The production of efficiently operating can handling methods and apparatus have not kept pace, and much wastage of time and labor is entailed in the handling of cans after they have been manufactured. It is commonly known that the cost of handling manufactured cans is greater than the cost of manufacturing the cans. For example, it has long been the practice to hand fork the cans into the cars by which they are transported, and from said cars or conveyor means into storage bins. This can handling practice presented many problems such as the necessity of employing workers skilled in the forking of the cans, of providing runways, or cableways to the cars and from the cars to storage bins, and of providing special, space consuming bins, not to speak of the necessity of so handling the cans seasonally, with resulting shortage of cars. Some progress has been made in relieving these conditions by packaging the cans in bags for shipment and storage, and some novel methods of and apparatus for so packaging the cans have been devised. These last mentioned methods of packaging the cans in bags or self contained units provide marked advantages because no special skill is required in handling the bags, no special storage space is required and the can bags can be handled, loaded and unloaded, as unit packages, rapidly and without the need of using individual can runways or cableways. Moreover, the packaging of the cans in bags permits storage in advance of season, a very valuable asset in relieving car shortage. However, in order to derive full benefit from the packaging of cans in bags, efficient methods and apparatus for unloading the cans from the bags must be made available so as to make cans in such packages practical and attractive to the customer. It is the purpose of the present invention to provide a novel and efficient apparatus for unloading the cans from the bags in which they are packaged, shipped and stored.

Another object of the invention is to provide a novel can bag unloading apparatus in which is included a mold or receiver in which to receive a can bag complement of cans arranged in multiple independent tiers with their longitudinal axes in parallel relation and with tier sheets separating the can tiers, said mold having converging walls to receive and support a corner of a can bag complement of cans and shaped to provide a can tier discharge outlet, and a can bag can complement bottom supporting end wall, said end wall being movable as a ram to push the can tiers along the mold in the direction of the can axes to discharge the cans from said outlet, tier after tier.

Another object of the invention is to provide a can bag unloading apparatus of the character stated in which the mold is tiltable between a receiving position in which the end wall is horizontal for receiving the can bag can complement thereon, and an unloading position in which the mold is placed to position the cans with their longitudinal axes in inclined relation to the horizontal so that the can sides will gravitate against underlying can sides and the can ends will gravitate against the tier sheets.

Another object of the invention is to provide an apparatus of the character stated wherein the mold is open at the end opposite the end wall or ram so that an operator can conveniently look into and inspect the interiors of the cans exposed through said open end when the mold is tilted to the can inclining position.

Another object of the invention is to provide an apparatus of the character stated wherein the discharge opening in the mold is formed in the converging mold walls and at the open end thereof, and there is included manually operable gate means for controlling the passage of cans through said opening.

Another object of the invention is to provide an apparatus of the character stated wherein the discharge opening in the mold is larger than the largest size of can to be unloaded and is closed by a readily removable insert composed of a fixed closure plate and a manually operable can discharge controlling gate, the relation of the size of gate and fixed plate being selectable in accordance with the size of cans to be unloaded in a particular run.

Another object of the invention is to provide an apparatus of the character stated in which there is included treadle operated means for moving the ram or end wall to present the can tiers at the discharge outlet one after another, the parts being so constructed and cooperatively arranged that the mold, when empty will tend to gravitate to the upright, can bag can complement receiving position.

Another object of the invention is to provide an apparatus of the character stated in which there is included a table on which to receive a bag of cans prior to the removal of the bag from the complement of cans and the placement of said can complement into the mold, the table being rotatable to facilitate the tearing away of bag portions.

Another object of the invention is to provide an apparatus of the character stated wherein the mold end wall or ram is horizontally disposed at approximately the level of the table when the mold is in its can bag can complement receiving position, there also being included a fixed table intervening said table and said ram and over which a portion of the first mentioned table extends so as to facilitate sliding of a can bag can complement off said first mentioned table, over the fixed table and onto said ram.

Another object of the invention is to provide an apparatus of the character stated which is very compactly arranged and mounted on wheels so that it can be moved about from place to place with great facility.

With the above and other objects in view that will hereinafter appear, the nature of the invention will be more clearly understood by reference to the following detailed description, the appended claims and the several views illustrated in the accompanying drawings.

In the drawings:

Figure 1 is a perspective view illustrating the invention, bag wall portions being in the process of being torn away.

Figure 2 is a right side elevation, the mold or receiver being shown in the upright, bag receiving position, and parts being broken away and in section.

Figure 3 is a rear elevation with the parts positioned as in Figure 2, parts being broken away and in section.

Figure 4 is a front elevation, the mold or receiver being shown in the tilted or unloading position.

Figure 5 is a right side elevation illustrating the parts in the position shown in Figure 4, parts being broken away and in section.

Figure 6 is a fragmentary perspective view illustrating the toggle arm extension and its engagement with the pawl control lever and the latch arm.

Figure 7 is a fragmentary right side elevation illustrating the device by which the ram is advanced step by step, the latching of the pawls out of effective contact with the ram plunger being shown.

Figure 8 is a rear elevation of the parts shown in Figure 7.

Figure 9 is a detail cross section taken on the line 9—9 on Figure 5.

Figure 10 is a detail cross section taken on the line 10—10 on Figure 5.

In the example of embodiment of the invention herein disclosed, the novel structural features are illustrated as incorporated in a mobile unit capable of being moved about with great facility, and which is capable of receiving bag complements of cans and rapidly and efficiently distributing them, tier after tier, onto conventional track runways or other feed-away conveyor means.

Mobile supporting frame

The unit structure includes a framing composed of two side frames generally designated 5 and which are connected by a pair of bottom traversing angles 6 and a pair of top front traversing angles 7, said angle pairs bearing parallel spaced relation and serving also to hold the side frames in upright parallel relation.

Each side frame 5 includes a rear corner upright 8 and a front corner upright 9, the latter having an upwardly and rearwardly inclined portion 10, and said uprights of each frame are joined by a top member 11 and a bottom member 12 to the latter of which the bottom traversing angles 6 are secured. It will be apparent by reference to Figure 1 that the top front traversing angles 7 are attached to the upwardly and rearwardly inclined portions 10 of the front corner uprights 9. Wheels 13 are attached to the front corner uprights 9 and make the unit readily mobile, and the lower end extremities 14 of the rear corner uprights 8 serve as rests in the manner clearly illustrated in Figures 1 and 2. Transversely aligned bearings 15 are secured upon the top members 11 and serve a purpose which will be explained hereinafter.

Can receiving and discharging hopper

Included on the apparatus is a can receiving and discharging hopper which includes a front plate generally designated 16 and having a vertical lower portion 17 and an upwardly and rearwardly inclined upper portion 18, said plate being fixed by securing nuts 19 on the front ends of a plurality of mounting bolts or rods 20 which are secured as at 21 to the front uprights 9 and to the traversing angles 7. The front plate 16, or rather the upper portion 18 thereof is equipped with a V-shaped clearance 22 in its central top edge portion, said clearance being defined by edge flares 23 on converging flared portions 24. It will be apparent by reference to Figures 1 and 4 of the drawings that the angled plate portions 23 and 24 provide a double flared guiding seat.

The hopper depth is defined by a rear plate 25 which is shaped to lie in generally parallel relation to the front plate 16, and said rear plate is adjustably secured on the mounting rods 20 by nuts 26. This rear plate also has a V-rest or clearance 27 which is aligned with the previously mentioned clearance 22. Front and rear track plates 28 and 29 are secured as at 30 on the rods 20, and the shape of these portions of the hopper structure is best illustrated in Figures 1, 4 and 5 of the drawings. By reference to Figure 4 it will be apparent that the track plates have center apexes 31 and outwardly and downwardly inclined can supporting edges 32. The rear plate 29 is formed of two pieces overlapping at 33 in order that the rear plate may be adjusted forwardly and rearwardly on the rods 20 for cans having different lengths. At each side the track plates 28 and 29 may deliver onto conventional track runways 34 or other feed-away conveyors.

The mold or can receiver

The mold or can receiver is generally designated 35 and includes converging side walls 36 which are reinforced by main traversing angles 37, longitudinal angles 38 and intermediate traversing and rest angles 39. The reinforced structure provided by the converging walls 36 and the angles referred to provide a V-shaped receiver or mold in which to receive a can bag complement of cans.

The mold or receiver is open at the top as at 40, when considered in its upright or can receiving position as shown in Figure 1, or at its front end, when considered in the tilted or unloading positions as illustrated in Figures 4 and 5. The mold or receiver is additionally reinforced by traversing bottom angles 41 which serve as distance pieces and retain the proper angular relation of the side walls 36. When the mold is in the lowered or unloading position, the rest angles of the mold are engageable on a rest 42 secured to the uppermost top angle 7 of the frame. The main traversing angles 37 have trunnions 43 projecting therefrom which are rockably received in the beforementioned frame bearings 15 in the manner clearly illustrated in Figures 1, 2, 3 and 5 of the drawings.

Side portions of the converging mold walls 36 are cut away as at 44 near the open top 40 to provide an opening through which to discharge the cans of the bag complement, tier by tier. It will be apparent by reference to Figures 2 and 5 that a reinforcing bar 45 is secured as at 46 to each side wall 36 along the opening 44. Each said bar is equipped with bearings 47 at its ends in which to rockably receive a shaft 48 having a crank extension 49 and a can discharge control gate 50 secured thereon. It will be noted that each control gate 50 includes angle bent stiffener edges 51, and a torsion spring 52 coiled about the respective shaft 48 and engaging at its respective ends against the adjacent bar 45 and the gate, constantly tends to hold the gate in the closed position.

A filler wall 53 is secured as at 54 to each of the mold side walls 36, and as at 55 to the respective reinforcing bar 45. Like the gates 50, each filler wall 53 is equipped with an angle bent end 56 adapted to abut or engage in face to face contact with the flange of the other filler wall in the manner clearly illustrated in Figure 10. The bent flanges at the ends of the gates 50 merely abut in face to face contact because one or both of said gates must be swingable to an open position for permitting cans to gravitate from the mold, but the abutting flanges of the filler walls 53 are secured together as at 57. See Figure 10. As before stated, both gates 50 may be swingable, or if desired, one only of said gates may be used to control the discharging of can tiers from the mold. When one gate is not to be freely swingable by manipulation of the crank extension 49, the angle bent stiffener flange 51 of said gate is secured to the adjacent stiffener flange 58 of the adjacent filler wall 53, as by use of bolt and spacer means 59. See Figure 9.

The bottom or end wall of the mold or receiver constitutes a ram 60 which is slidable between the converging side walls 36. The ram or bottom plate 60 is secured to a center plate 61 having a center post 62 projecting therefrom to which a support and actuator column or plunger 63 is adjustably secured as at 64. It will be apparent by reference to Figures 2 and 5 of the drawings that a disk or piston 65 is secured to the end extremity of the plunger 63, and said piston is slidable in a cylinder or tube 66 which depends from the hub 67 of a casting 68 which is secured as at 69 to the bottom angles 41 by which the mold or receiver is reinforced. The plunger 63 is equipped with equidistantly spaced notches 70 at one side thereof, and equidistantly spaced notches 71 are provided in the opposite side thereof. It will also be apparent by reference to Figures 5 and 7 of the drawings that the lower end portion of the plunger 63 at the side equipped with the notches 70 is enlarged or provided with a camming surface at 72, and the purpose of the notches and this camming surface will be explained hereinafter.

The lower end of the cylinder or tube 66 is closed by a plug 73 which is equipped with a dash-pot orifice 74 effective to suitably retard movement of the plunger 63 and its end disk 65 within said cylinder.

An adjustable ram stop 75 is secured as at 76 to one of the reinforcing angles 41 in the manner clearly illustrated in Figures 2 and 3 of the drawings.

Can bag support

It will be apparent by reference to Figures 1 to 5 that a support tube 77 is adjustably secured in horizontal position as at 78 to the corner uprights 8 and 9 of one side frame, and said tube is equipped with a handle extension 79. A cylinder or column 80 is rigidly secured as at 81 to the tube 77 and extends downwardly therefrom in the manner clearly illustrated in Figures 1, 3 and 4 to engage at its lower extremity 82 with the floor so as to provide a supplementary support for the apparatus. A support column 83 is freely rotatable in the top portion of the column 80 and carries a bag supporting table 84 thereon. It will be apparent by reference to Figures 1 and 5 that the table 84 includes a thin rectangular top plate 85 which is so shaped, and is placed at such a level, as to be turnable over the intermediate supporting table 86 which is carried on the column 87 rigidly secured as at 88 to the tube 77. In Figure 1 a bag of cans is indicated at 89, the same being positioned upon the supporting table 84, 85. By making the table structure 84, 85 freely rotatable it is possible for an operator to stand at one side of the table and tear away a corner of the bag, and then by pulling on the torn corner, the lower portion of the bag can be torn away about the whole perimeter, by rotation of the table and without the necessity of the operator leaving his position at one side thereof. The tearing away of the lower portion of the bag wall structure is indicated at 90 and the tearing away of the bag walls serve to expose the sides of the cans in the tiers 91 in the manner clearly illustrated in Figure 1, the tiers of cans being separated by the usual tier sheets 92 in the manner clearly illustrated and well known in the art.

Ram actuating means

The devices for moving the ram 60 step by step to present the tiers one after another at the can discharging opening are best illustrated in Figures 1, 2, 3 and 5 to 8 of the drawings.

The hub 67 of the casting 68 is provided with a pair of ears or bearings 93 which serve to rockably support a cross shaft 94 whereon is secured a pawl 95. The pawl is centered over the plunger 63 and is engageable through a longitudinal opening provided in the casting with the equidistantly spaced notches 71 formed on said plunger. See Figures 1, 3 and 5. On one end of the shaft 94 is mounted a pawl control lever 96 having a angled cam portion 97 at its free end extremity, and on the other end of said shaft is mounted a pawl release lever 98. The pawl 95, the pawl control lever 96 and the pawl release lever 98 are movable in unison, all being secured to the cross shaft 94, and the relation of these parts is best illustrated in Figures 2, 5, 7 and 8.

A bell crank lever generally designated 99 is pivoted as at 100 on the casting 68, and said lever includes an arm 101, an arm 102 and a lug projection 103, the latter being projected in position for being engageable with a limiting pin 104 secured on the casting 68 in the manner clearly illustrated in Figures 5 and 7. The free end of the arm 101 is bifurcated and carries a pawl 105 which is pivoted thereon intermediate its ends as at 106, one end of said pawl being presented for engagement with the plunger 63 and the notches 76 thereon in the manner clearly illustrated in Figure 5, and the other end of said pawl being equipped with a transversely projected pin 107, the purpose of which will be described hereinafter. The free end of the other bell crank lever arm 102 carries a cross pin 108, and it will be apparent by reference to Figure 8 that a latch arm 109 is pivotally mounted on one end of said cross pin. The latch arm projects upwardly from its mounting on the cross pin and is provided with a transversely projected pin 110 and is equipped at its upper free end with a latch trip portion 111 and a pawl latching seat 112. A spring anchor 113 is attached to the bell crank 99, and a spring 114 attached to said anchor and to the pawl pin 107 constantly tends to urge the pawl 105 against the plunger 63. A spring 115 attached to the anchor 113 and to the latch arm pin 110 constantly tends to move the latch arm 109 toward the pawl pin 107.

The cross pin 108 is pivotally attached at its other end to the upper end of a toggle member 116, the latter being equipped with an upward extension 117 having a block 118 secured thereon. The toggle arm extension and block arrangement is best illustrated in Figures 7 and 8 from which it will be apparent that the block is equipped with a pin 119 which projects laterally therefrom in position for engaging with the pawl control lever 95. The toggle member 116 is pivotally connected as at 120 with another toggle member 121 which is in turn pivotally connected as at 122 with the rear end of an actuator tube 123. See Figures 1, 3 and 5. The tube 123 is adjustably pivoted intermediate its ends as at 124 on supports 125 which are secured to the traversing angles 6, and a treadle 126 is attached to the front end of said tube. An anchored spring 127 connected with the frame structure and the tube 123 constantly tends to lift the treadle end of the tube and depress the toggle member connected end thereof, and a spring 128 connected with a pin 129 projecting from the upper toggle member 116 and a pin 130 projecting from the lower toggle member 121 tends to hold the toggle members in the toggle locked position illustrated in Figure 5 or in the toggle broken position illustrated in Figures 1 and 2. A block 131 pivotally mounted on the toggle member pin 129 has an actuator rod 132 connected therewith, and said rod passes freely through a frame supported eye 133 to a position at the front of the apparatus. At its forwardly extended end extremity, said actuator rod is equipped with a knob 134 which facilitates hand manipulation thereof.

*Operation*

In describing the operation of the apparatus it should be assumed that the parts are in the bag receiving or loading position illustrated in Figures 1, 2 and 3 of the drawings. It will be noted that the mold or receiver 35 is in its upright can bag complement receiving position, the toggle connection of the arms 116 and 121 is broken and the pawls 105 and 95 are held out of engagement with the ram plunger 63 in the manner clearly illustrated in Figure 2.

A bag of cans 89 is placed on the table 84, 85 in the manner illustrated in Figure 1, and the lower wall portions of the bag are torn away in the manner indicated at 90 in said Figure 1. Since the table 84, 85 is free to rotate, the operator may tear away the bag wall portions with great facility while standing in a single position at one side of the table. The tearing away of the bag wall portions exposes the can tiers 91 with the tier sheets 92 interposed therebetween, and after tearing off the lower portions of the bag, the upper or remaining portion of the bag can be removed by withdrawing the same upwardly. This removal of the bag leaves the bottom of the bag on the table top 85. As previously explained, the table top 85 is rectangular in shape and is disposed at such a level that it may be turned to present one end thereof over the intermediate, fixed table 86. It is now a simple matter to slide the can bag complement from the table top 85 over the fixed table 86 and onto the ram 60 which is disposed at the level of the table 86 in the manner clearly illustrated in Figure 1.

The operator now manually tilts the mold or receiver 35 about its trunnion mountings 43 to lower the same into its unloading position, the latter being disclosed in Figures 4 and 5. As the mold is so tilted its V-shaped bottom portion formed by the converging side walls 36 will be received in the hopper clearance 27, and the double flared wall portions 24 and 23 defining the V-clearance 22 in the front hopper wall will serve to avoid any jamming of the mold or any cans which might be slightly displaced incidental to the tilting of said mold. It will be readily apparent that the angle at which the open end of the mold is presented toward the operator is such that the operator can peer with great facility into the interiors of the exposed cans and thus will be able to quickly detect and remove any cans which may be bent or otherwise defective or improperly placed. The angular or inclined presentation of the mold also places the cans with their axes inclined both to the horizontal and to the vertical, and this inclined position is such that the cans are held by gravity side upon side, and the action of gravity also serves to hold the ends of the cans against the tier sheets 92 so that the latter will serve as effective guiding means during the running out or discharging of the cans.

It is to be understood that the adjustable stop 75 is so placed that it positions the ram 60 for presenting the uppermost or foremost tier of cans opposite the discharge control gates 56. It is to be understood that both gates 50 may be used during the discharging of each tier of cans, or one gate only at one side or the other of the mold can be utilized for this purpose, the other gate being secured in fixed position in the manner previously described and illustrated in detail in Figure 9. When the mold has been tilted in the manner described the operator then manipulates the crank or cranks 49 to free the tier of cans and allow them to gravitate onto and roll away over the discharging trackways 31, 32 and 34. By properly manipulating the gate or gates 50 the rapidity at which the cans run out by gravity action can be suitably controlled.

After the first tier of cans has been discharged, the ram 60 is moved forwardly by the operator, this being accomplished by depressing the treadle 126. It is to be understood, of course, that before thus depressing the treadle, the operator grasps the knob 134 and pulls the rod 132 forwardly to make certain that the toggle members 116 and 121 are locked in the position illustrated in Figure 5. Ordinarily, the mere tilting of the mold 35 to the unloading position shown in Figure 5 will suffice to lock the toggle, but by manipulation of the rod 132 this necessary condition can be assured. Depression of the treadle 126 with the toggle members 116 and 121 in the locked condition illustrated in Figure 5 will swing the bell crank lever 99 in a counterclockwise direction, as viewed in Figure 5, and this will cause the pawl 105 to engage with the foremost plunger notch 70 and advance the ram 60 the distance of a can height. Gravity will then cause the retaining pawl 95 to drop into the foremost plunger notch 71 and retain the position of the ram. It is to be understood that the lower pawl 105 advances the plunger so that the cooperating top notch 71 is a little ahead of the top pawl 95. Thus when the treadle 126 is released and the lower pawl 105 is retracted by clockwise movement of the bell crank 99 resulting from the lifting of the forward end of the tube 123 by the spring 127, the cooperating notch 71 will be certain to properly come back against the retaining pawl 95. The operation of advancing the ram 60 step by step in the manner described, and the controlled discharging of the can tiers by manipulation of the gate means 50 is repeated until the ram has been advanced to its limit of movement and all of the can tiers have been discharged. To return the mold to the upright or loading position illustrated in Figures 1 to 3 the operator pushes the knob 134 so as to break the toggle lock of the members 116 and 121 in the manner illustrated in Figure 7. This will result in a slight lowering of the pivotal connection 120 of the toggle members, and the bell crank lug extension 103 will be brought against the limiting pin 104. Simultaneously with this movement, the pin 119 projecting from the toggle member extension 117, 118 will move the pawl control lever 96 forwardly, and this movement will serve to displace the pawl 95 from its contact with the plunger 63 and also free the pin 110 projecting from the latch arm 109 so that the spring 115 will push said latch arm to the left as illustrated in Figure 7 and cause it to engage with the pawl release lever 98 to hold the pawl 95 away from the plunger 63, and said latch arm seat 112 also will engage under the lower pawl pin 107 and latch said lower pawl 105 out of effective contact with the plunger 63. It is to be noted by reference to Figure 7 that when the ram has been advanced to its foremost position the camming projection 72 on the plunger 63 will engage with the front end of the pawl 105 and properly position the pawl to have its pin 107 positioned for being engaged and latched by the latch arm seat 112 in the manner illustrated in Figure 7. In this manner both of the pawls 95 and 105 are latched out of effective contact with the ram plunger 63.

The operator now tilts the mold back to the loading position and the ram and plunger will return by gravity action to the lowered position illustrated in Figures 1 and 2, this downward movement of the ram being cushioned by the dash-pot action of the ram piston 65 and the orificed cylinder plug 73.

It is to be understood that the mold will be again loaded in the manner previously described, and when the mold is returned or tilted to its unloading position after this reloading, the toggle lock is restored to the position illustrated in Figure 5 in the manner previously described. This causes the block 118 on the toggle member extension 117 to engage the pin 110 on the latch arm 109 and disengage said latch arm from the pawl pin 107, and also from its displacing engagement with the pawl release lever 98. The pawls 95 and 105 will be thus freed and the former will fall by gravity action against the ram plunger 63, and the latter 105 will be pressed against said plunger by action of the spring 114.

During the return of the toggle members to the locked position illustrated in Figure 5 the cam surface 97 provided at the lower end extremity of the control lever 96 will be engaged by the block pin 119 and displaced should there be any tendency of the pin to come up in front of said lever. It should be understood that when the toggle members 116 and 121 are in the locked position illustrated in Figure 5 they not only serve as a thrust means for oscillating the bell crank lever 99 and the pawl 105 carried thereby, but they also serve in conjunction with the bell crank lever extension lug 103 and the casting pin 104 as a locking means preventing tilting of the mold from its unloading position shown in Figure 5 to the loading position illustrated in Figure 1 without first breaking the toggle.

It is to be understood that the ram plunger 63 is a change part and will be replaced by a plunger having differently spaced notches accordingly as the apparatus is set up for unloading cans of different heights. The necessary variation in the throw of the pawls can be brought about by adjustment of the pivotal mounting of the treadle tube 123. Similarly, the inserts consisting of the reinforcing bars 45, the filler walls 53 and the gates 50 may be replaced to adapt the apparatus for unloading different heights of cans. As before stated the substitute inserts will have filler walls of lesser width and control gates 50 of greater widths as the heights of cans to be unloaded are increased.

As before described, the gates 50 may be hand actuated selectively or in unison to control the discharging of the cans. By suitable manipulation of one or both gates the operator can allow the cans to run out rapidly by full opening, or by partial opening can allow the cans to run out one at a time.

While one form of the invention has been shown for purposes of illustration it is to be clearly understood that various changes in the details of construction and arrangement of parts may be made without departing from the spirit and scope of the invention as defined in the appended claims.

We claim:

1. In apparatus of the character described, a mold in which to receive a bag complement of cans arranged in multiple tiers with their longitudinal axes in parallel relation and with tier sheets separating the can tiers, said mold having converging walls to receive and support a corner of a bag complement of cans and shaped to provide a can tier discharge outlet, and a can bag complement bottom supporting end wall, said end wall being movable as a ram to push the can tiers along the mold in the direction of the longitudinal axes of the cans to discharge the cans from said outlet, tier after tier.

2. Apparatus as defined in claim 1 in which the mold is tiltable between a receiving position in which the end wall is horizontal for receiving the can bag can complement thereon, and an unloading position in which the mold is placed to position the longitudinal axes of the cans in inclined relation to the horizontal so that the can sides will gravitate against underlying can sides and the can ends will gravitate against the tier sheets.

3. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in inclined relation to the horizontal so that the can sides will gravitate against underlying can sides and the can ends will gravitate against the tier sheets, and open can ends will be presented for convenient inspection through said open mold end.

4. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end.

5. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end, and in which the can discharge outlet is formed in the converging walls at the open end of the mold, and there is included manually operable gate means for controlling the passage of cans through said outlet.

6. In apparatus of the character described, a mold in which to receive a bag complement of cans arranged in multiple tiers with their longitudinal axes in parallel relation and with tier sheets separating the can tiers, said mold having converging walls to receive and support a corner of a bag complement of cans and shaped to provide a can tier discharge outlet, and a can bag can complement bottom supporting end well, said end wall being movable as a ram to push the can tiers along the mold in the direction of the longitudinal axes of the cans to discharge the cans from said outlet, tier after tier, and means for advancing said end wall step-by-step to serially discharge can tiers from the mold.

7. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in inclined relation to the horizontal so that the can sides will gravitate against underlying can sides and the can ends will gravitate against the tier sheets, and open can ends will be presented for convenient inspection through said open mold end, and in which there is included means for advancing said end wall step-by-step to serially discharge can tiers from the mold.

8. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end, and in which the can discharge outlet is formed in the converging walls at the open end of the mold, and there is included manually operable gate means for controlling the passage of cans through said outlet, said discharge outlet being dimensioned to pass the greatest height of can to be unloaded in the apparatus, and said gate means being in the form of a removable and replaceable unit having a swingable gate of a size for passing the height of can to be unloaded in the then effective set up, gate bearing means and filler wall means of a size selected to fill that portion of the outlet not covered by the gate.

9. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end, and in which the can discharge outlet is formed in the converging walls at the open end of the mold, and there is included manually operable gate means for controlling the passage of cans through said outlet, said discharge outlet being dimensioned to pass the greatest height of can to be unloaded in the apparatus, and said gate means being in the form of a removable and replaceable unit carried by each of the converging walls, each said unit having a swingable gate of a size for passing the height of can to be unloaded in the then effective set up, gate bearing means and filler wall means of a size selected to fill that portion of the outlet not covered by the gate.

10. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end, and in which the can discharge outlet is formed in the converging walls at the open end of the mold, and there is included manually operable gate means for controlling the passage of cans through said outlet, said discharge outlet being dimensioned to pass the greatest height of can to be unloaded in the apparatus, and said gate means being in the form of a removable and replaceable unit carried by each of the converging walls, each said unit having a swingable gate of a size for passing the height of can to be unloaded in the then effective set up, gate bearing means and filler wall means of a size selected to fill that portion of the outlet not covered by the gate, and means also being provided for securing a selected one of the gates to the associated filler wall when it is desired that one gate only be employed in controlling the discharging of cans.

11. Apparatus as defined in claim 1 in which the mold is entirely open at the end thereof opposite the end wall and is tiltable between a receiving position in which the end wall is horizontal for receiving the can bag can complement thereon, and an unloading position in which the mold is placed to position the longitudinal axes of the cans in generally horizontal relation so that open can ends will be presented for convenient inspection through said open mold end, means also being provided for advancing said end wall step-by-step to serially discharge can tiers from the mold, and the center of gravity of the mold and said end wall advancing means being so arranged that the mold, when empty, will tend to gravitate to the receiving position.

12. In apparatus of the character described, a mold in which to receive a bag complement of cans arranged in multiple tiers with their longitudinal axes in parallel relation and with tier sheets separating the tiers, said mold being shiftable between a can receiving position and a can discharging position, and a can bag supporting table means whereon to receive a bag of cans in position for having the bag complement of cans thereon shifted from the table into the mold, said table means including a freely rotatable top portion for supporting said bag and which is free to rotate as an operator tears the bag from the complement of cans therein preparatory to the shifting of said bag complement of cans from the table means into the mold.

13. Apparatus as defined in claim 12 in which there is included a supporting frame structure common to the mold and the table, and wheels supporting the frame structure to render the apparatus as a whole mobile.

14. Apparatus as defined in claim 12 in which there is included means for tiltably supporting the mold so that the shifting of the mold is by a tilting thereof, and wherein the mold includes an end wall placeable in horizontal position at approximately the same level as the table when the mold is in its can receiving position so as to readily receive the bag complement of cans from the table, said end wall being movable as a ram when the mold is tilted to its can discharging position for pushing the can tiers along the mold in the direction of their axes to discharge the cans tier after tier.

15. Apparatus as defined in claim 12 in which the table means includes a fixed table and a table having a freely rotatable top portion disposed close to and at substantially the same level as the fixed table, and in which there is included means for tiltably supporting the mold so that the shifting of the mold is by a tilting thereof, and wherein the mold includes an end wall placeable in horizontal position at approximately the same level as the rotatable and fixed tables and close to the latter when the mold is in its can receiving position so as to readily receive the bag complement of cans shifted from the rotatable table over the fixed table onto said end wall, said end wall being movable as a ram when the mold is tilted to its can discharging position for pushing the can tiers along the mold in the direction of their longitudinal axes to discharge the cans tier after tier.

16. Apparatus as defined in claim 12 in which the table means includes a fixed table and a table having a freely rotatable top portion disposed close to and at substantially the same level as the fixed table, and in which there is included means for tiltably supporting the mold so that the shifting of the mold is by a tilting thereof, and wherein the mold includes an end wall placeable in horizontal position at approximately the same level as the rotatable and fixed tables and close to the latter when the mold is in its can receiving position so as to readily receive the bag complement of cans shifted from the rotatable table over the fixed table onto said end wall, said end wall being movable as a ram when the mold is tilted to its can discharging position for pushing the can tiers along the mold in the direction of their longitudinal axes to discharge the cans tier after tier, said apparatus also including a supporting frame structure common to the mold and said table means, and wheels supporting the frame structure to render the apparatus as a whole mobile.

17. Apparatus as defined in claim 1 in which the mold is tiltable between a receiving position in which the end wall is horizontal for receiving the can bag can complement thereon and an unloading position in which the mold is placed to position the longitudinal axes of the cans in generally horizontal relation, and there being also included a hopper having a receiving seat against which the mold is tilted and front and rear walls bearing generally parallel spaced relation to serve as guides for cans discharging through the mold outlet, and tracks over which the discharging cans can roll through said hopper.

18. Apparatus as defined in claim 1 in which the mold is tiltable between a receiving position in which the end wall is horizontal for receiving the can bag can complement thereon and an unloading position in which the mold is placed to position the longitudinal axes of the cans in generally horizontal relation, and there being also included a hopper having a receiving seat against which the mold is tilted and front and rear walls bearing generally parallel spaced relation to serve as guides for cans discharging through the mold outlet, and tracks over which the discharging cans can roll through said hopper, said discharge outlet being formed in the converging walls of the mold and controlled by manually operable gate means, said discharge outlet being dimensioned to pass the greatest height of can to be unloaded in the apparatus, and said gate means being in the form of a removable and replaceable unit having a swingable gate of a size for passing the height of can to be unloaded in the then effective set up, gate bearing means, and filler wall means of a size selected to fill that portion of the outlet not covered by the gate, and said hopper walls being variable as to relative spacing to correspond to the size of cans being unloaded.

19. In apparatus of the character described, a mold in which to receive a bag complement of cans arranged in multiple tiers with their longitudinal axes in parallel relation and with tier sheets separating the can tiers, said mold having converging walls to receive and support a corner of a bag complement of cans and shaped to provide a can tier discharge outlet, a can bag can complement bottom supporting end wall, said end wall being movable as a ram to push the can tiers along the mold in the direction of the longitudinal axes of the cans to discharge the cans from said outlet, tier after tier, said mold being tiltable between a receiving position in which the end wall is horizontal for receiving the can bag can complement thereon and an unloading position in which the mold is placed to position the longitudinal axes of the cans in generally horizontal position, and means for advancing said end wall step-by-step to serially present can tiers at the discharge outlet, said last named means including a plunger projecting from the end wall and having notches thereon at equidistantly spaced intervals corresponding to can heights, and a manually reciprocable pawl means engageable with said notches.

20. In apparatus of the character described, a mold in which to receive a bag complement of cans arranged in multiple tiers with their longitudinal axes in parallel relation and with tier sheets separating the can tiers, said mold having converging walls to receive and support a corner of a bag complement of cans and shaped to provide a can tier discharge outlet, a can bag can complement bottom supporting end wall, said end wall being movable as a ram to push the can tiers along the mold in the direction of the longitudinal axes of the cans to discharge the cans from said outlet, tier after tier, said mold being tiltable between a receiving position in which the end wall is horizontal for receiving the can bag can complement thereon and an unloading position in which the mold is placed to position the longitudinal axes of the cans in generally horizontal position, and means for advancing said end wall step-by-step to serially present can tiers at the discharge outlet, said last named means including a plunger projecting from the end wall and having notches thereon at equidistantly spaced intervals corresponding to can heights, reciprocable pawl means engageable with said notches, and treadle operated means for reciprocating the pawl means.

21. Apparatus as defined in claim 19 in which there is included an adjustable stop means for determining the initial positioning of the end wall in the mold, and means for adjusting the relation of the end wall and the plunger notches.

22. Apparatus as defined in claim 19 in which the end wall plunger also has back check notches thereon, and there is included a back check pawl engageable with the back check notches for preventing retrograde movement of said end wall.

23. Apparatus as defined in claim 19 in which the end wall plunger also has back check notches thereon, and there are included a back check pawl engageable with the back check notches for preventing retrograde movement of said end wall, and means for displacing the pawls from their effective engagement with the notched plunger when the mold is tilted to its receiving position, thereby to allow the end wall to gravitate to its can bag can complement receiving position, and for again replacing said pawls in their effective position when the mold is returned to its unloading position.

24. Apparatus as defined in claim 19 in which the end wall plunger also has back check notches thereon, and there are included a back check pawl engageable with the back check notches for preventing retrograde movement of said end wall, means for displacing the pawls from their effective engagement with the notched plunger when the mold is tilted to its receiving position, thereby to allow the end wall to gravitate to its can bag can complement receiving position, and for again replacing said pawls in their effective position when the mold is returned to its unloading position, and dashpot means for retarding movement of the end wall and plunger to said receiving position.

25. Apparatus as defined in claim 20 in which the pawl reciprocating means includes a thrust member composed of breakable toggle arms which when in toggle lock position act as thrust means for actuating the pawl and as a prop preventing tilting of the mold to its receiving position, and which when in the toggle broken position will permit tilting of the mold to said receiving position, means also being provided for manually breaking said toggle.

26. Apparatus as defined in claim 20 in which the pawl reciprocating means includes a thrust member composed of breakable toggle arms which when in toggle lock position act as thrust means for actuating the pawl and as a prop preventing tilting of the mold to its receiving position, and which when in the toggle broken position will permit tilting of the mold to said receiving position, means also being provided for manually breaking said toggle, the center of gravity of said mold and pawl reciprocating means being so arranged that the mold, when empty, will tend to gravitate to the can bag can complement receiving position.

27. Apparatus as defined in claim 20 in which the pawl reciprocating means includes a thrust member composed of breakable toggle arms which when in toggle lock position act as thrust means for actuating the pawl and as a prop preventing tilting of the mold to its receiving position, and which when in the toggle broken position will permit tilting of the mold to said receiving position, means also being provided for manually breaking said toggle, and said treadle includes a treadle actuater disposed in generally horizontal position and being connected at one end with the toggle arms and adjustably pivoted intermediate its ends so that the throw of the pawl can be varied by adjusting said pivot.

References Cited in the file of this patent

UNITED STATES PATENTS

| Number | Name | Date |
| --- | --- | --- |
| 1,507,864 | Smith | Sept. 9, 1924 |
| 2,112,486 | Francis | Mar. 29, 1938 |
| 2,307,194 | Benning | Jan. 5, 1943 |
| 2,506,661 | Busse | May 9, 1950 |
| 2,515,718 | Kroner | July 18, 1950 |